No. 884,729.
PATENTED APR. 14, 1908.
H. GRONDAHL.
COMPUTING SLIDE RULE.
APPLICATION FILED AUG. 14, 1905.
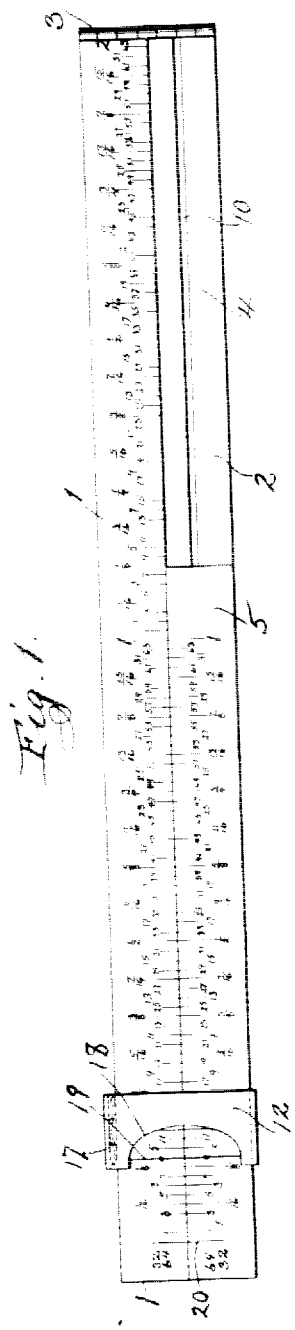
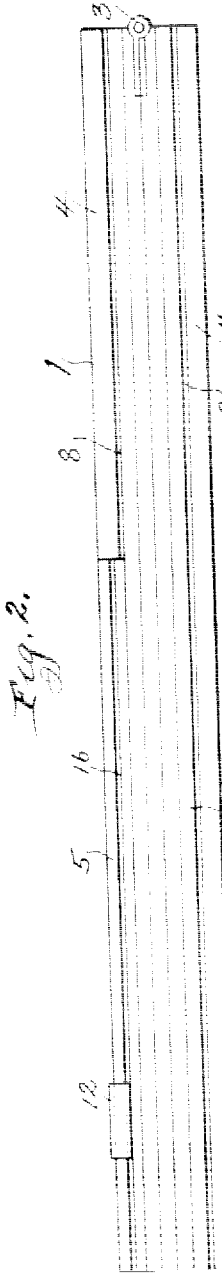
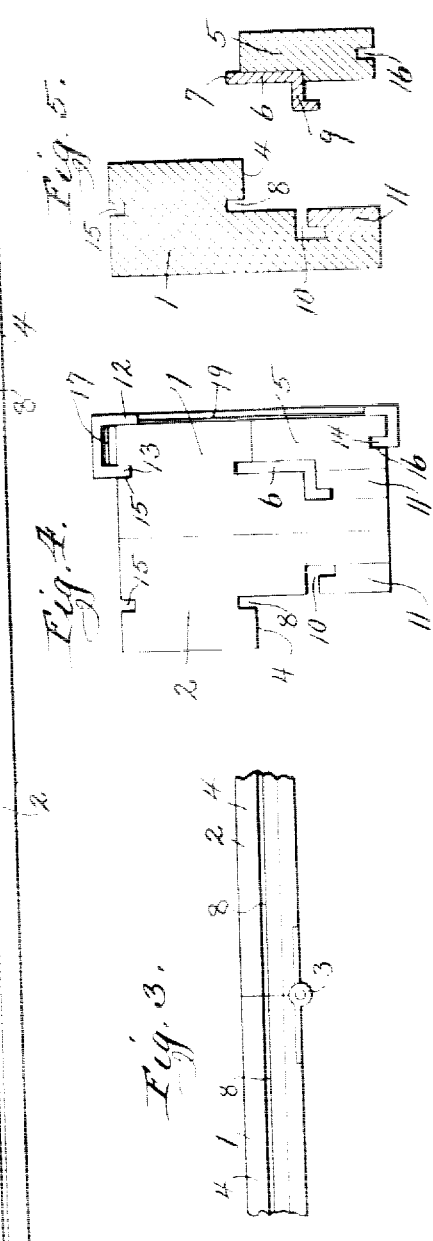
Witnesses:
R. J. Jackis
F. L. Belknap
Inventor:
Henrik Grondahl
By Albert L. Graves
Atty.

UNITED STATES PATENT OFFICE.

HENRIK GRÖNDAHL, OF CHICAGO, ILLINOIS, ASSIGNOR TO BURGESS & SAUERBERG, OF GRAND RAPIDS, MICHIGAN, A COPARTNERSHIP.

COMPUTING SLIDE-RULE.

No. 884,729.  Specification of Letters Patent.  Patented April 14, 1908.

Application filed August 14, 1905. Serial No. 274,036.

*To all whom it may concern:*

Be it known that I, HENRIK GRÖNDAHL, a citizen of the United States, residing at Chicago, in the county of Cook and State of Illinois, have invented certain new and useful Improvements in Computing Slide-Rules, of which the following is a specification.

This invention relates to improvements in computing slide rules and it has for its object to provide a device of the character referred to suitable for performing with facility additions and subtractions particularly when such computations involve fractions.

Another object of the invention is to provide an improved construction enabling the rule to be made cheaply and reliably and when made characterized by compactness and simplicity of manipulation.

I am aware that slide rules have been made in great variety but I know of none so constructed and arranged that by simply shifting a single slide progressively along the main rule a series of additions or subtractions, or both, may be performed and the result read directly from the instrument. Moreover I am not aware that it has ever been proposed to depart from actual units of measurement in laying out or graduating a slide rule and substitute enlarged scales which enable the operator to easily read measurements which are in fact microscopical and this without the aid of a magnifying instrument and without danger of misreading. These and other improved results are accomplished by my present invention which will be readily understood from the following description, reference being had to the accompanying drawings in which:

Figure 1 is a plan view of a preferred embodiment of the invention shown folded. Fig. 2 is an edge view of the same. Fig. 3 is an edge view of a fragmentary portion of the central part of the rule. Fig. 4 is an end elevation, shown considerably enlarged. Fig. 5 is a cross sectional view of one member of the rule the slide being disconnected from the main body to show more clearly its construction.

Referring to said figures, 1 and 2 designate the main body members of the rule, these being similar and hinged together by a rule joint 3, so that when extended in alinement the rule forms a straight bar of uniform cross sectional construction throughout.

Each body member is provided with an angular rabbet 4 extending throughout its length; these rabbets being alike and arranged to register when the rule members are in alinement. Within the rabbet is arranged to fit and slide, a slide member 5. The member is preferably of suitable cross sectional form to occupy the rabbet 4 and form in conjunction with the main members a rule rectangular in cross section.

As an improved feature of construction, the slide 5 is provided at its inner angle with an angular plate 6, one edge of which 7 projects into a corresponding groove 8 in the rule body while the other edge 9 projects laterally and is bent at right angles at a point outside the plane of the slide and engages a corresponding groove 10 in the rule body. For convenience of construction the groove is formed by applying separate strips 11 of suitable cross sectional form to the main body members and securing them rigidly in position.

A marker designated as a whole 12, is mounted to slide upon the rule body; this marker conveniently taking the form of a clip internally shaped to fit upon the rule and provided at each end with inturned lips 13 and 14 which engage grooves 15 and 16 formed in the rule body members and slide member respectively. In order to hold the marker yieldably in any given position, a bent plate spring 17 is interposed between the edge of the rule body and the embracing part of the clip which overlies said edge. The face side of the marker is partially cut away as indicated at 18 and an index wire 19 extended across this cut away portion perpendicular to the longitudinal axis of the rule, so that it may be brought into register with any pair of graduation marks.

Each member of the rule body is provided with a graduated scale arranged adjacent to the edge of the rabbet along which the slide member travels. In the particular embodiment of the invention shown the rule is divided into parts corresponding to the usual fractions of a foot, namely, into divisions corresponding to inches, quarter inches, eighths, sixteenths, thirty-seconds and sixty-fourths. It is to be particularly noted however that these divisions are not intended to be calibrated to actual measurements, but on the contrary are much larger and sufficiently so that the smallest divisions and the numerals designating the same may be read conveniently without resorting to a magnifying instrument. It will be noted that the subdivisions of each unit division are numbered regularly beginning at the left hand end of each unit and it is also to be noted that, unlike logarithmic slide rules, the divisions are of uniform dimensions throughout the rule. The slide member 5 is provided with a scale which is substantially a duplicate of a corresponding part of the scale on the main members. In other words when the slide is shifted to the extreme left of the rule, which corresponds to the zero position, the parts of the two scales then in register are identical.

In using the instrument additions may be performed by shifting the slide so as to bring the index or zero line 20 into register with the first member on the main rule, then finding the second member to be added thereto on the slide and finally reading as the sum of the two numbers, that number on the main rule which is opposite. In case three or more numbers are to be added, after the sum of the first two has been found, the marker is shifted into position to retain this number, the slide then shifted until its index line registers with the index wire of the marker and the third number found upon the slide and the sum upon the main rule as before, and so on through any number of shifts which may be made upon the full length of the rule. Subtractions are of course performed in exactly the reverse manner.

I claim as my invention:

1. In a slide rule comprising a main body provided with a guide way extending throughout its principal length, a scale laid off upon said main body in uniform-length unit divisions and one or more series of uniform-length fractional divisions of each unit division, a slide mounted upon said guide way and provided with a scale essentially a duplicate as to divisions of a corresponding part of the main body scale, said main body being of two-part construction and the members thereof united by a rule joint arranged to bring the respective portions of the guide way into register and alinement when the main members are in alinement.

2. In a slide rule the combination of a main body provided with a longitudinally extending guide way formed therein, a slide fitting said guide way and means holding the slide against lateral displacement from the way, comprising an angle plate rigidly secured to the slide and projecting at its edge from the latter and an undercut groove formed longitudinally in said way and receiving the edge of said angle plate.

3. In a slide rule the combination of a main body provided with a longitudinally extending guide way formed therein, a slide fitting said guide way and means holding the slide against lateral displacement from the way comprising a right angled approximately Z-shaped plate secured to the slide having both of its edges projecting therefrom, and undercut grooves formed in said main body, corresponding to and receiving the projecting edges of said confining plate.

HENRIK GRÖNDAHL.

Witnesses:
HARRY B. LANGLEY,
FRANK L. BELKNAP.